United States Patent Office 3,554,962
Patented Jan. 12, 1971

3,554,962
LIGHT STABLE POLYURETHANES
William K. Fischer, Woodbury, Conn., assignor to Uniroyal, Inc., New York, N.Y., a corporation of New Jersey
No Drawing. Filed Mar. 29, 1968, Ser. No. 717,387
Int. Cl. C08g 41/00, 51/58, 51/60
U.S. Cl. 260—45.8
5 Claims

ABSTRACT OF THE DISCLOSURE

Light stable polyurethane prepolymer compositions containing
(a) polyether polyurethane prepolymer made from aromatic diisocyanate (e.g. TDI),
(b) polyether polyurethane prepolymer made from "hydrogenated MDI," i.e., 4,4'-methylenebis(cyclohexylisocyanate),
(c) ultraviolet light screening agent, and
(d) antioxidant.

The prepolymer compositions produce light stable products even when cured with diamine curvatives which normally present a light stability problem, such as MOCA [4,4'-methylenebis(ortho-chloroaniline)].

BACKGROUND OF THE INVENTION

(1) Field of the invention

The invention relates to polyurethane prepolymer compositions and cured polyurethanes obtained from such compositions.

(2) Description of the prior art

The state of the art of stabilized polyurethane compositions is represented by such patents as 3,012,987, Ansul, Dec. 12, 1961; 3,201,372, Wagner, Aug. 17, 1965; and 3,351,608, Oertel et al., Nov. 7, 1967; and by such publications as Chemical Week, Sept. 24, 1966, page 87. The object of this invention is to provide a more satisfactory solution to the problem of light stable polyurethane compositions, especially from the standpoint of convenience, effectiveness, economy and speed of cure of the composition. More particularly, it is an object of the invention to improve upon the light stability of polyurethane compositions cured with the rapidly-acting diamine curatives which normally give rise to instability to light.

SUMMARY OF THE INVENTION

The invention is based on the discovery that highly effective light stable polyurethane prepolymer compositions are obtained by mixing
(a) a polyether polyurethane prepolymer made from an aromatic diisocyanate,
(b) a polyether polyurethane prepolymer made from 4,4'-methylenebis(cyclohexylisocyanate),
(c) an ultraviolet light screening agent, and
(d) an antioxidant.

The foregoing mixture can be cured surprisingly rapidly to a cross-linked or chain-extended state with the aid of a bi-functional curative for isocyanate-terminated polyurethane prepolymers. The resulting product has remarkably improved color stability, even when subject to exposure to ultraviolet light or outdoor weathering conditions. Rapidly-acting diamine curatives which normally give rise to color stability problems can be used in the present composition to yield color stable products.

DESCRIPTION OF THE PREFERRED EMBODIMENTS

It has been observed that polyether and polyester polyurethane prepolymers cured with aromatic diamine curatives such as methylene dianiline (MDA) or 4,4'-methylenebis(ortho-chloroaniline) (MOCA) discolor rapidly and severely in short term exposure to Weatherometer or outdoor aging. Marked color change is evident in as short an exposure as 24 hours in the Weatherometer. The degree of color change may be measured with the aid of a color comparator, such as a Hellige model 605 color comparator. Films having an initial Hellige color rating of 1 before exposure, change to a rating of 8 after only 48 hours exposure in the Weatherometer (ASTM Method D-1499-59-T).

The significance of improved color stable polyurethane prepolymers, cured with conventional curatives, cannot be over-emphasized. Many urethanes produced by prior art techniques, because of inadequate color stability, cannot be used in various applications. Coatings for floors, wood and metal furniture, automobiles, boats, etc. represent but a few of the applications where the excellent adhesion characteristics of polyurethanes could be used to advantage, if economical and rapidly curing light stable polyurethanes were available. The invention is directed to advancement of the art in this respect.

Unfortunately, incorporation of ultraviolet screening agents to enhance color stability does not afford a satisfactory solution to the problem. This can be demonstrated by preparing a series of polyurethane prepolymers containing conventional ultraviolet screening agents, as listed in Table I. The "Prepolymer A" shown in Table I may be prepared by heating one mole of polytetramethylene ether glycol (molecular weight 1,000) and two moles of commercial tolylene diisocyanate (e.g., 80% 2,4-isomer; 20% 2,6-isomer) at a temperature of about 230° F. for about one hour, to form an isocyanate-terminated prepolymer which is a viscous liquid having an amine equivalent of 660. 100 parts (all quantities are expressed herein by weight, unless otherwise indicated) of the prepolymer was mixed with 30 parts of methyl ethyl ketone as a diluent to facilitate spreading of films; 1 part of an ultraviolet screening agent, as indicated in Table I (in the case of Run I-1, no ultraviolet screening agent was added), and 18.5 parts of MOCA curative were added. The resulting compositions were then cast on glass in films of 20 mils thickness. The films were then air cured for 25 hours at 73° F. on the bench top, then oven cured for 4 hours at 158° F. The films were then Weatherometer exposed with the results indicated in Table II.

TABLE I

| | Parts prepolymer A | Parts curative (MOCA) | U.V. screening-agents | Antioxidant (parts) | Methyl ethyl ketone (parts) |
|---|---|---|---|---|---|
| Run No.: | | | | | |
| I-1 | 100 | 18.5 | None | None | 30 |
| I-2 | 100 | 18.5 | Substituted benzotriazole * (U.V. 327) | 1 | 30 |
| I-3 | 100 | 18.5 | 2,4'-dihydroxy-4-methoxy benzophenone (U.V. 24) | 1 | 30 |
| I-4 | 100 | 18.5 | 2,3'-dihydroxy-4,4'-dimethoxy-benzophenone (D-49) | 1 | 30 |
| I-5 | 100 | 18.5 | 2,3'-4,4'-tetrahydroxy-benzophenone (D-50) | 1 | 30 |

* 2-(2'-hydroxy-3',5'-di-tertiary-butylphenyl)-5-chloro-1,2,3-benztriazole.

TABLE II

| Run No.: | Unexposed Hellige color | 48 hour Weatherometer | 96 hour Weatherometer |
|---|---|---|---|
| I-1 | 1 | 8 | 9 |
| I-2 | 1 | 4 | 5 |
| I-3 | 1 | 4 | 5 |
| I-4 | 1 | 3+ | 5 |
| I-5 | 1 | 3+ | 5 |

Thus, while some improvement in color stability may be seen in Table II, the results clearly indicate that conventional light screening agents used at normal levels have only a moderate effect in maintaining color stability for extremely limited periods of exposure.

It is unfortunate that the desired stabilizing effect is similarly non-obtainable merely by using conventional antioxidants in polyether polyurethane prepolymers. This may be demonstrated by preparing the compositions listed in Table III, and casting these compositions in 20 mil films, which are thereafter cured and subjected to weatherometer aging, as described previously. The weatherometer results are indicated in Table IV.

TABLE III

| Run No.: | Prepolymer A (parts) | MOCA (parts) | Antioxidant | Parts antioxidant | Methyl ethyl ketone (parts) |
|---|---|---|---|---|---|
| III-1 | 100 | 18.5 | None | | 30 |
| III-2 | 100 | 18.5 | Diphenyl phosphite | 1 | 30 |
| III-3 | 100 | 18.5 | 2,5-di-(tert-amyl) hydroquinone | 1 | 30 |
| III-4 | 100 | 18.5 | Zinc dibutyl dithiocarbamate | 1 | 30 |
| III-5 | 100 | 18.5 | Phenyl salicylate | 1 | 30 |

TABLE IV

| Run No.: | Unexposed Hellige color | 48 hour Weatherometer | 96 hour Weatherometer |
|---|---|---|---|
| III-1 | 1 | 8 | 9 |
| III-2 | 1 | 8 | 9 |
| III-3 | 1 | 3 | 5 |
| III-4 | 1 | 6 | 8 |
| III-5 | 1 | 4 | 5 |

Table IV indicates that while some improvement in color stability results by incorporation of antioxidants, nevertheless the improvement falls considerably short of adequate effectiveness required for clear, light stable film.

In Table V, experiments performed with Prepolymer A described above, and with further prepolymers identified as Prepolymer B and Prepolymer C, are shown. Prepolymer B may be prepared by heating one mole of polypropylene glycol (molecular weight 1,000) with two moles of tolylene diisocyanate, for about one hour at a temperature of about 230° F., to produce an isocyanate-terminated viscous liquid prepolymer having an amine equivalent of 656. Prepolymer C may be prepared by heating one mole of polypropylene glycol (molecular weight 1,000) with two moles of "hydrogenated MDI," that is, 4,4' - methylenebis(cyclohexylisocyanate), along with .01% by weight of dibutyl tin dilaurate, for about one hour at about 230° F. to provide an isocyanate-terminated prepolymer having an amine equivalent of 765. The prepolymers, dissolved in methyl ethyl ketone, are mixed with curative, U.V. screening agent, and antioxidant, as shown in Table V, and the compositions are cast into films (20 mils) which are air dried and oven cured. In some of the experiments shown in Table V, blends of the prepolymers were employed.

The color stabilities of the films were measured in accordance with ASTM Method D-1499-59T, by exposure to Weatherometer aging, with the results shown in Table VI.

TABLE V

| Run No.: | Prepolymer | Parts | Prepolymer | Parts | MOCA (parts) | MDA (parts) | U.V. screening agent* (parts) | Antioxidant (parts) | Methyl ethyl ketone (parts) | Gel time** (minutes) |
|---|---|---|---|---|---|---|---|---|---|---|
| V-1 | A | 100 | | | 18.5 | | .5 | .5 | 30 | 120 |
| V-2 | B | 100 | | | 18.5 | | .5 | .5 | 30 | 85 |
| V-3 | C | 100 | | | 16.5 | | .5 | .5 | 30 | 1,000+ |
| V-4 | C | 100 | | | | 12 | .5 | .5 | 30 | 120 |
| V-5 | A | 50 | B | 50 | 18.5 | | .5 | .5 | 30 | 105 |
| V-6 | A | 50 | C | 50 | 17.35 | | .5 | .5 | 30 | 200+ |
| V-7 | B | 50 | C | 50 | | 12.9 | .5 | .5 | 30 | 8 |

\* U.V. 327 substituted benzotriazole.
\*\* Time at 73° C. to become too viscous to spread out into a smooth film.

The antioxidant employed in the compositions shown in Table V may be a 2,5-di (secondary alkyl) hydroquinone in which the alkyl groups are mixed $C_{14}-C_{16}$ alkyl groups. Such an antioxidant may be prepared by reacting mixed $C_{14}-C_{16}$ alpha-olefins with hydroquinone as described in Example VI of U.S. Pat. 3,428,821, Hunter, Jan. 28, 1969. The MOCA and MDA levels in the compositions of Table V were adjusted to approximately .9 mole ratio equivalents of the prepolymers.

TABLE VI.—HELLIGE COLOR RATING AFTER VARIOUS AGING PERIODS IN WEATHEROMETER

| Run No.: | Unaged color | 48 hour color | 96 hour color | 192 hour color | 288 hour color | 348 hour color |
|---|---|---|---|---|---|---|
| V-1 | 1 | 3 | 4 | 7 | 10 | 10 |
| V-2 | 1 | 2 | 3 | 6 | 8 | 10 |
| V-3 | | | Did not cure | | | |
| V-4 | 1 | 1 | 1 | 1 | 1 | 1 |
| V-5 | 1 | 3 | 4 | 7 | 10 | 10 |
| V-6 | 1 | 1 | 1 | 1 | 1 | 1+ |
| V-7 | 1 | 1 | 1 | 1+ | 1+ | 1+ to 2 |

The results in Table VI indicate that the compositions based on polyether prepolymers A and B made with aromatic diisocyanate discolored moderately after 48 and 96 hours Weatherometer exposure, even though they contained U.V. screening agent and antioxidant. The discoloration became progressively more pronounced up to 348 hours, at which time both the Prepolymer A and B compositions exhibited extreme discoloration (Runs V-1 and V-2).

The composition based on Prepolymer C, made with the aliphatic diisocyanate "hydrogenated MDI," failed to gel in a reasonable length of time with MOCA (Run V-3). However, with MDA as the curative, a normal gel time of 120 minutes was achieved (Run V-4). The color of the composition in the Run V-4 film remained virtually unaffected after 348 hours of Weatherometer exposure. However, such a composition, unfortunately, while it gels rapidly, does not cure sufficiently firm or tough to be suitable for purposes of the present invention.

Furthermore, the composition based on the blend of Prepolymers A and B, shown in Run V-5, exhibited the same unsatisfactory degree of discoloration as was exhibited by the individual Prepolymers A and B in Runs V-1 and V-2.

Surprisingly, the compositions based on the blend of the aromatic Prepolymer A and the aliphatic Prepolymer C (made with hydrogenated MDI), containing ultraviolet screening agent and antioxidant, exhibited an entirely unexpected resistance to Weatherometer discoloration, as shown in Run V-6, which represents the practice of the invention. It should be noted that the 1+ Hellige rating after 348 hours exposure is well below the average value of 10 and 1 for the individual components (Run V-1 and V-4). A Hellige color rating in the vicinity of 5 would be expected for the blend if a merely additive affect was involved. Certainly, the 1+ Hellige rating exhibited by the blend after the 348 hours exposure represents an unusual cooperative effect resulting from the blends.

The blend of polyether prepolymers B and C, shown in Run V-7, which is also within the scope of the invention, also exhibited strong light stable interaction, although not quite to the degree as in Run V-6.

The cooperative interaction shown in Runs V-6 and V-7 is due to the presence of hydrogenated MDI. This compound is the only variable which is common to both compositions.

A further series of experiments was performed to determine whether the unexpectedly good color retention shown in Runs V-6 and V-7 was due solely to blending the Prepolymers A or B with Prepolymer C. In this series, the blend ratios of Prepolymer B and Prepolymer C were varied from 100-0, through 50-50, without addition of either an ultraviolet light screening agent or an antioxidant. One formulation containing both an ultraviolet light screening agent and an antioxidant was included in this series for purposes of comparison. The compositions are shown in Table VII. The Weatherometer test results on 20 mil films, air dried for 24 hours at 73° F. and oven cured for 4 hours at 160° F., are shown in Table VIII.

TABLE VIII.—HELLIGE COLOR RATING AFTER VARIOUS PERIODS OF WEATHEROMETER AGING

| | Unaged color | 48 hour color | 96 hour color | 192 hour color | 288 hour color |
|---|---|---|---|---|---|
| Run No.: | | | | | |
| VII-1 | 1 | 5 | 7 | 9 | 10 |
| VII-2 | 1 | 3 | 4 | 4+ | 5 |
| VII-3 | 1 | 3 | 4 | 4+ | 5 |
| VII-4 | 1 | 3 | 4 | 4+ | 5 |
| VII-5 | 1 | 2 | 2+ | 4 | 4+ |
| VII-6 | 1 | 1 | 1 | 1+ | 1+ |

The figures in Table VIII indicate that blends of polyether Prepolymer B (made from aromatic diisocyanate) and polyether Prepolymer C (made from hydrogenated MDI) do not exhibit straight line color improvement, in relation to the ratios of polymers in the blends.

From the foregoing it will be apparent that marked improvement in color stability is achieved when both ultraviolet light screening agent and antioxidant are added to the blend of prepolymer based on aromatic diisocyanate and prepolymer based on the aliphatic 4,4'-methylenebis (cyclohexylisocyanate). Therefore, in order to obtain the new results shown in Runs V-6, V-7, and VII-6, which illustrate the practice of the invention, a 4-component blend is required, comprised of the following ingredients:

(a) Prepolymer based on aromatic diisocyanate, as in Prepolymer A or B;
(b) Prepolymer based on 4,4'-methylenebis(cyclohexylisocyanate), as in Prepolymer C;
(c) Ultraviolet light screening agent; and
(d) Antioxidant.

The composition of the invention is notable for the good combination of physical properties in the cured product, and for the retention of these properties on aging, whereas a composition made from prepolymer (b), without prepolymer (a) is not susceptible of being cured to a state in which it has high tensile strength and other desirable physical properties. In addition, compositions based on prepolymer (b) only are undesirably expensive.

Further investigation was made to establish minimum levels of the components of the composition of the invention. In Table IX are listed compositions comprised of varying ratios of Prepolymer B, Prepolymer C, ultraviolet light screening agent, and antioxidant. The ultraviolet light screening agent and the antioxidant may be the same

TABLE VII

| | Prepolymer B | Prepolymer C | MDA | Methyl ethyl ketone | Adipic acid gel promoter | U.V. screening agent | Antioxidant |
|---|---|---|---|---|---|---|---|
| Run No.: | | | | | | | |
| VII-1 | 100 | | 14.2 | 30 | .1 | | |
| VII-2 | 87.5 | 12.5 | 14.2 | 30 | .1 | | |
| VII-3 | 75 | 25 | 14.2 | 36 | .1 | | |
| VII-4 | 62.5 | 37.5 | 14.2 | 36 | .1 | | |
| VII-5 | 50 | 50 | 14.2 | 30 | .1 | | |
| VII-6 | 75 | 25 | 14.2 | 30 | .1 | .5 | .5 |

The ultraviolet light screening agent and antioxidant employed in Table VII may be the same as employed in Table V.

as described in connection with Table V. These compositions were cast in 20 mil films, air dried, and oven cured for four hours at 158° F., as before. The Weatherometer test results are shown in Table X.

TABLE IX

| | Prepolymer B | Prepolymer C | U.V. screening agent | Antioxidant | Adipic acid | Curative (MDA) | Methyl ethyl ketone |
|---|---|---|---|---|---|---|---|
| Run No.: | | | | | | | |
| IX-1 | 87.5 | 12.5 | | | .1 | 14.2 | 40 |
| IX-2 | 87.5 | 12.5 | 1.0 | | .1 | 14.2 | 40 |
| IX-3 | 87.5 | 12.5 | | 1.0 | .1 | 14.2 | 40 |
| IX-4 | 87.5 | 12.5 | .5 | .5 | .1 | 14.2 | 40 |
| IX-5 | 87.5 | 12.5 | .25 | .25 | .1 | 14.2 | 40 |
| IX-6 | 75 | 25 | .25 | .25 | .1 | 14.2 | 40 |
| IX-7 | 75 | 25 | .5 | .5 | .1 | 14.2 | 40 |

TABLE X.—HELLIGE COLOR RATING AFTER WEATHEROMETER AGING FOR VARIOUS PERIODS

| | Unexposed color | 48 hr. color | 96 hr. color | 192 hr. color | 288 hr. color | 402 hr. color |
|---|---|---|---|---|---|---|
| Run No.: | | | | | | |
| IX-1 | 1 | 5+ | 8 | 8+ | 9 | 10 |
| IX-2 | 1 | 3 | 3+ | 4+ | 5+ | 6 |
| IX-3 | 1 | 3 | 4+ | 6 | 8 | 8 |
| IX-4 | 1 | 2+ | 3 | 4 | 5 | 6 |
| IX-5 | 1 | 2+ | 3 | 4+ | 5+ | 6+ |
| IX-6 | 1 | 1 | 1 | 1+ | 3 | 4 |
| IX-7 | 1 | 1 | 1 | 1 | 1+ | 1+ |

The data in Table X indicate that the minimum levels of the components required to obtain adequate color stability are the levels shown in Example IX-7, which represents the practice of the invention. The minimum levels are at least 25 parts of prepolymer based on 4,4'-methylenebis(cyclohexylisocyanate), as represented by Prepolymer C, per 100 parts of the mixture of 4,4'-methylenebis-(cyclohexylisocyanate) prepolymer plus aromatic diisocyanate prepolymer (as represented by Prepolymer B), at least 0.5 part of ultraviolet light screening agent, and at least 0.5 part of antioxidant. A suitable upper limit for the amount of prepolymer based on the aliphatic diisocyanate 4,4-methylenebis(cyclohexylisocyanate) is about 50 parts per 100 parts of the blend of prepolymer from aromatic diisocyanate plus prepolymer from aliphatic diisocyanate. While there is no critical upper limit on the amount of ultraviolet light screening agent or the amount of antioxidant, it may be stated that for most ordinary purposes it is not necessary to use more than 1 or 2 parts of each of these (based on 100 parts of prepolymers) and for reasons of economy not more than 5 parts of each would ordinarily be used.

It is desired to emphasize that for purposes of the invention any conventional ultraviolet light screening agent and any conventional antioxidant (non-staining), of the kind ordinarily suitable for use in polyurethanes, may be employed. Thus, it may be mentioned by way of non-limiting example that suitable conventional ultraviolet light screening agents, also called ultraviolet absorbers, are defined and described in "Modern Plastics Encyclopedia," 1968, pages 406–409, and are listed in variety in the chart on pages 508, 509, the disclosures of which are hereby incorporated herein by reference. Important classes of useful ultraviolet screening agents include the hydroxyphenyl benzotriazoles, such as 2-(2'-hydroxyphenyl)benzotriazoles, the 2-hydroxybenzophenones, the substituted acrylonitriles, the salicylic acid derivatives and the 2-hydroxyphenyltriazines. Examples are 2-(hydroxyphenyl) benzotriazole, 2 - hydroxybenzophenone, ethyl-2-cyano-3-phenyl cinnamate (substituted acrylonitrile), phenyl salicylate, and 1,3,5 - tris(2' - hydroxyphenyl)triazine. Further examples are t-butyl phenyl salicylate, 2,4-dihydroxy benzophenone (Uvinyl 400), 2,4-dibenzoyl resorcinol, 2-hydroxy-4-methoxy benzophenone, alkylated 2-hydroxyphenyl benzotriazole, 2-hydroxy-4-octyloxy benzophenone, and 1-cyano-2, 2-diphenyl acrylonitrile. Other examples are 2-(2'-hydroxy-3',5'-di-t-butylphenyl)-5-chloro-1,2,3 - benzotriazole (Tinuvin 327), 2,4'-dihydroxy-4-methoxy benzophenone (Uvinul D24), 2,2'-dihydroxy-4,4'-dimethoxy benzophenone (Uvinul D49), 2,2'4,4'-tetrahydroxy benzophenone (Uvinul D50), 2,2-dihydroxy-4-methoxy benzophenone and 2(2'-hydroxy-5-methylphenyl) benzotriazole (Tinuvin P), p-aminazobenzene, hydroquinone, etc. Similarly, it may be mentioned by way of non-limiting example that suitable conventional antioxidants are disclosed in the comprehensive review article in 1963 in "Rubber Chemistry and Technology," volume 36, pages 1497 and following, by Amberlang et al., particularly in Table II (pages 1507–9), Table III (page 1513); Table IV (pages 1514–6), Table V (page 1519), and Table VII (pages 1536–8), and the references cited therein. Antioxidants suitable for use in the invention are also disclosed in U.S. Pat. 2,985,617, Salyer et al., May 23, 1961, particularly column 15, line 56 to column 16, line 44. Particularly suitable antioxidants which may be mentioned by way of non-limiting example include 2,2'-methylenebis(4-methyl-6-nonylphenol), 2,2' - methylenebis(4-methyl-6-t-butylphenol), 2,6-di(t-butyl)-4-methyl phenol, and similar substituted phenols; substituted hydroquinones, including the 2,5-dialkyl hydroquinones, such as those obtained by reacting alpha - olefins with hydroquinone, e.g., 2,5-di-($C_{14}/C_{16}$ alkyl) hydroquinone, as disclosed in U.S. Pat. 3,428,821 previously referred to as well as 2,5-di(t-butyl) hydroquinone; bis-phenols, such as polybutylated bisphenol A; bis-phenol sulfides such as bis (3-methyl-4-hydroxybenzyl) sulfide, 2,2'-thiobis (6-t-octyl-4-methylphenol); hydrazides such as adipic hydrazides, bis(hydroxy-alkylbenzylthio) compounds of the type disclosed in U.S. Pat. 3,331,792, O'Shea, July 18, 1967, such as bis(2-hydroxy-3-nonyl-5-methylbenzylthio) diethyl ether; phosphites such as diphenyl phosphite, tris(nonylphenyl) phosphite; salicylates such as phenyl salicylates; metal dialkyl dithiocarbamates such as zinc dibutyl dithiocarbamate, etc. In same cases a particular chemical may serve at least in part to perform both an antioxidant function and an ultraviolet absorbing function. For further information on antioxidants suitable for use in the invention reference may be had to "Modern Plastics Encyclopedia," 1968, pages 418, 419 and 521, and the chart on pages 503–5.

By way of non-limiting example, a few such ultraviolet light screening agents and antioxidants are illustrated in the examples of the invention listed in Table XI.

EXAMPLE XI

| Example: | Prepolymer B | Prepolymer C | Antioxidant | Amount of antioxidant | U.V. screening agent | Amount of U.V. screening agent | Adipic acid | MDA | Methyl ethyl ketone |
|---|---|---|---|---|---|---|---|---|---|
| XI-1 | 75 | 25 | $C_{14}/C_{16}$ dialkylated hydroquinone | .5 | Substituted hydroxy benzotriazole.[1] | .5 | .1 | 14.2 | 40 |
| XI-2 | 75 | 25 | 2,5-di(t-butyl) hydroquinone | .5 | ...do... | .5 | .1 | 14.2 | 40 |
| XI-3 | 75 | 25 | Alkylated bis phenol [2] | .5 | ...do... | .5 | .1 | 14.2 | 40 |
| XI-4 | 75 | 25 | 2,6-di(t-butyl-4-methyl) phenol | .5 | ...do... | .5 | .1 | 14.2 | 40 |
| XI-5 | 75 | 25 | Polymeric phenol [3] | .5 | ...do... | .5 | .1 | 14.2 | 40 |
| XI-6 | 75 | 25 | Adipic hydrazide | .5 | ...do... | .5 | .1 | 14.2 | 40 |
| XI-7 | 75 | 25 | Bis(3-methyl-4-hydroxy benzyl) sulfide | .5 | ...do... | .5 | .1 | 14.2 | 40 |
| XI-8 | 75 | 25 | $C_{14}/C_{16}$ dialkylated hydroquinone | .5 | 2-hydroxy-4-methoxy-benzophenone. | .5 | .1 | 14.2 | 40 |
| XI-9 | 75 | 25 | ...do... | .5 | 2,2-dihydroxy-4-methoxy-benzophenone. | .5 | .1 | 1.42 | 40 |
| XI-10 | 75 | 25 | ...do... | .5 | 2(2'-hydroxy-5-methyl phenyl)-benzotriazole. | .5 | .1 | 14.2 | 40 |

[1] Tinuvin 327.
[2] 2,2-methylenebis(4-methyl-6-nonylphenol.
[3] Wingstay L.

TABLE XII.—WEATHEROMETER DISCOLORATION, HELLIGE COLOR RATING

| Example: | Unaged | 48 hours | 96 hours | 144 hours | 288 hours | 432 hours |
|---|---|---|---|---|---|---|
| XI-1 | 1 | 1 | 1 | 1 | 1+ | 2 |
| XI-2 | 1 | 1 | 1 | 1 | 1+ | 2− |
| XI-3 | 1 | 1 | 1 | 1+ | 2 | 3 |
| XI-4 | 1 | 1 | 1 | 1+ | 2+ | 4 |
| XI-5 | 1 | 1 | 1 | 1 | 2 | 3 |
| XI-6 | 1 | 1 | 1 | 1 | 1+ | 2− |
| XI-7 | 1 | 1 | 1 | 1+ | 2+ | 3+ |
| XI-8 | 1 | 1 | 1 | 1+ | 2+ | 3+ |
| XI-9 | 1 | 1 | 1 | 1 | 2 | 3 |
| XI-10 | 1 | 1 | 1 | 1 | 2 | 3 |

The polyether polyurethane prepolymer of type (a) employed in the invention, that is, the polyether polyurethane prepolymer based on aromatic diisocyanate, is of course a conventional material and is represented by such prepolymers as are derived from hydroxy-terminated polyethers, usually diols (and/or higher polyols such as triols), preferably polyalkylene ether glycols (suitably those having a molecular weight of from about 500 or less to about 6,000 or more), such as polyethylene glycol, polypropylene glycol, polytetramethylene glycol, etc. These prepolymers are made in known manner by heating the polyether with at least an approximately equivalent amount of an aromatic diisocyanate, so as to produce an isocyanate-terminated polyurethane. The aromatic diisocyanates conventionally used for this purpose include isomeric mixtures of toluene diisocyanates, naphthalene-1,5-diisocyanate, diphenylmethane-4,4'-diisocyanate, m-phenylene diisocyanate, 2,4-toluene diisocyanate, 2,6-toluene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate (in some cases higher polyisocyanates such as p,p',p''-triphenylmethane triisocyanate may be present). Suitable polyethers and aromatic diisocyanates, as well as prepolymers made therefrom, are disclosed, for example, in U.S. Pats. 2,957,852, 3,257,261, 3,284,539 and 3,351,608, and the references cited therein.

The other type of polyether polyurethane prepolymer employed in the invention, that is, polyether polyurethane prepolymer (b) derived from the aliphatic diisocyanate 4,4'-methylenebis(cyclohexylisocyanate), also called "hydrogenated MDI," is also a conventional material, and may be made in known manner by reacting at least an approximately equivalent amount of 4,4'-methylenebis-(cyclohexylisocyanate) with an hydroxy-terminated polyether as previously described.

As in conventional practice, the present 4-component stabilized polyurethane prepolymer composition is eventually converted to a "cured" (chain-extended or crosslinked) state with the aid of conventional curing substances for isocyanate-terminated polyurethanes. As is well understood by those skilled in the art, such curing agents contain active hydrogen atoms which are reactive with isocyanate groups. As is disclosed in 3,194,793, 3,284,539, 3,255,129 and 3,350,332 such curing agents include organic diamines (e.g., aromatic amines such as p,p'-diaminodiphenylmethane, p-phenylene diamine, aliphatic amines such as hexamethylenediamine, tetramethylene diamine), aminophenols (p-aminophenol, m-aminophenol), aminoalcohols (ethanolamine, p-aminobenzyl alcohol), diols or triols (e.g., 1,4-butanediol and trimethylolpropane), as well as water (particularly when it is desired to produce foam), and in some cases additional diisocyanate is used in the curing. Various catalytic or promoting substances such as adipic acid, tin complexes (e.g., dibutyl tin dilaurate), or tertiary amines may be employed to aid the curing.

Particularly useful are the bifunctional curatives having two active hydrogens. U.S. Pat. 3,379,691, Sundholm, Apr. 23, 1968 discloses highly useful curatives which are aromatic diamines made by condensing 2-chloroaniline and 2,5-dichloroaniline with formaldehyde. Other useful aromatic diamine curatives, disclosed in U.S. Pat. 3,412,071, Sundholm, Nov. 19, 1968, are made by condensing aniline and 2-chloroaniline with formaldehyde.

Diamine curatives may be employed along with other curatives, such as diols, if desired.

The light-stable polyurethane composition of the invention may be shaped in various desired useful forms by such processes as coating, casting, molding, calendering, extruding, etc., depending on the consistency of the composition, and the particular article desired. In some cases, it may be advantageous to dissolve the composition in a suitable solvent, to provide a consistency more suitable for spraying, casting or impregnating. The composition may if desired include suitable fillers or pigments, such as titanium dioxide. Protective surface coatings, and useful molded objects of all sorts, are among the uses for the composition of the invention.

Having thus described my invention, what I claim and desire to protect by Letters Patent is:

1. A cured polyurethane composition made by curing, with a diamine, a composition comprising
   (a) a polyether-aromatic diisocyanate polyurethane prepolymer,
   (b) a polyether - 4,4' - methylenebis(cyclohexylisocyanate) polyurethane prepolymer,
   (c) an ultraviolet light screening agent and
   (d) an antioxidant,
said composition containing from 25 to 50 parts of (b), from 0.5 to 5 parts of (c) and from 0.5 to 5 parts of (d), per 100 parts by weight of (a) plus (b).

2. A cured composition as in claim 1, in which the diamine is an aromatic diamine selected from the group consisting of methylene dianiline, and 4,4'-methylenebis (ortho-chloroaniline).

3. A cured composition as in claim 1, in which the aromatic diisocyanate in (a) is tolylene diisocyanate.

4. A cured composition as in claim 2, in which the aromatic diisocyanate in (a) is tolylene diisocyanate.

5. A cured polyurethane composition made by curing, with a diamine, a composition comprising
   (a) a polyether-tolylene diisocyanate polyurethane prepolymer,
   (b) a polyether - 4,4' - methylenebis(cyclohexylisocyanate) polyurethane prepolymer,
   (c) an hydroxyphenyl benzotriazole as an ultraviolet light screening agent and
   (d) a dialkylated hydroquinone as an antioxidant,
said composition containing from 25 to 50 parts of (b), from 0.5 to 5 parts of (c) and from 0.5 to 5 parts of (d), per 100 parts by weight of (a) plus (b), the said diamine being methylene dianiline.

References Cited
UNITED STATES PATENTS

| 2,915,496 | 12/1959 | Swart et al. | 260—45.7 |
| 2,984,645 | 5/1961 | Hoeschele | 260—45.8 |
| 3,148,173 | 9/1964 | Axelrood | 260—75 |
| 3,351,608 | 11/1967 | Oertel et al. | 260—45.9 |
| 3,406,143 | 10/1968 | Stacy, Jr. et al. | 260—45.8 |
| 3,182,037 | 5/1965 | Nelson | 260—45.75 |
| 3,379,675 | 4/1968 | Jensen et al. | 260—45.8 |

OTHER REFERENCES

Hampton et al., "Oil and Colour Chemists Ass'n. Journal," vol. 43, No. 2, February 1960, p. 110.

Sampson et al., "Rubber Age," vol. 89, No. 2, May 1961, p. 265.

DONALD E. CZAJA, Primary Examiner

R. A. WHITE, Assistant Examiner

U.S. Cl. X.R.

260—45.7, 45.75, 45.85, 45.9, 45.95, 77.5